United States Patent [19]

Sampson

[11] 4,114,809
[45] Sep. 19, 1978

[54] WIND POWERED HYDRAULIC HEATING SYSTEM

[76] Inventor: Arthur R. Sampson, 4 Grandview Dr., Franklin, Mass. 02038

[21] Appl. No.: 804,949

[22] Filed: Jun. 9, 1977

[51] Int. Cl.$^2$ .............................. F24J 3/02; F24C 9/00
[52] U.S. Cl. ..................................... 237/1 A; 122/26; 126/247; 417/34
[58] Field of Search ............ 417/278, 279, 34; 137/78; 126/247; 122/26; 237/1 R, 1 A; 290/44, 55

[56] References Cited

U.S. PATENT DOCUMENTS

| 3,952,223 | 4/1976 | Browning | 126/247 |
|---|---|---|---|
| 3,989,189 | 11/1976 | Kita | 126/247 X |
| 4,015,962 | 4/1977 | Tompkins | 62/2 |

*Primary Examiner*—William E. Wayner
*Assistant Examiner*—William E. Tapolcai, Jr.
*Attorney, Agent, or Firm*—John E. Toupal

[57] ABSTRACT

A heating apparatus including a circulation system for hydraulic fluid, a pump for pumping the fluid, a windmill for driving the pump, an adjustable pressure responsive relief valve for restricting the flow of hydraulic fluid in the circulation system and establishing therein an adjustable fluid pressure reduction, a sensor responsive to the wind velocity encountered by the windmill, a valve control mechanism responsive to the sensor for automatically adjusting the fluid pressure reduction provided by the relief valve and a heat exchanger for removing heat from the hydraulic fluid. The work performed by the wind in pumping the hydraulic fluid through the relief valve is converted directly into heat that is conveyed to the heat exchanger for conversion into a useful form. By adjusting the relief valve to establish increasing pressure reductions with increasing wind velocity, the system optimizes the rate of wind energy utilization.

11 Claims, 3 Drawing Figures

WIND POWERED HYDRAULIC HEATING SYSTEM

BACKGROUND OF THE INVENTION

This invention relates generally to a fluid heating system and, more particularly, to a wind powered fluid heating system.

Most modern heating systems rely on petroleum products as a primary source of energy. However, because of the ever-increasing interest in reducing the levels of air pollution and in retarding the depletion of diminishing petroleum resources, alternate forms of heating energy are being sought more enthusiastically. Of such alternate energy sources, solar energy has received particular attention. However, another major source of energy, the wind, has been generally ignored. Most previous attempts at harnessing the wind energy have entailed the conversion of the wind's kinetic energy into mechanical energy and then into electrical energy. The installation and maintenance costs of these wind powered mechanical-electrical heating systems have prevented them from gaining extensive acceptance. Another disadvantage of such systems results from the complexities inherent to electrical energy storage. Other attempts have been made to employ the wind's kinetic energy with mechano-hydro-thermo energy converters but efforts in this area also have been unsuccessful.

The object of this invention, therefore, is to provide an improved, more efficient wind powered heating system.

SUMMARY OF THE INVENTION

The invention is a heating apparatus including a circulation system for hydraulic fluid, a pump for pumping the fluid, a windmill for driving the pump, an adjustable pressure responsive relief valve for restricting the flow of hydraulic fluid in the circulation system and establishing therein an adjustable fluid pressure reduction, a sensor responsive to the wind velocity encountered by the windmill, a valve control mechanism responsive to the sensor for automatically adjusting the fluid pressure reduction provided by the relief valve and a heat exchanger for removing heat from the hydraulic fluid. The work performed by the wind in pumping the hydraulic fluid through the relief valve is converted directly into heat that is conveyed to the heat exchanger for conversion into a useful form. By adjusting the relief valve to establish increasing pressure reductions with increasing wind velocity, the system optimizes the rate of wind energy utilization.

In one embodiment of the invention, the sensor is a gauge that senses directly the wind velocity experienced by the windmill. A wind responsive vane is coupled by a mechanical lever mechanism to the relief valve and increases the closing bias thereon in response to increasing levels of wind velocity. Another embodiment employs an hydraulic gauge for controlling the closing bias of the relief valve. The gauge responds to the relief valve inlet pressure which is in turn dependent upon the wind velocity available to drive the hydraulic pump.

An important feature of the invention is the provision of a solar heating system for heating the hydraulic fluid in a reservoir that feeds the circulation system. The solar system complements the wind powered system to establish a more uniform rate of heat conversion. Other features of the invention include an adjustable flow control valve connected in series with the pump and the relief valve and a temperature responsive bypass valve connected in parallel with the relief valve. The flow control valve can be adjusted to establish a predetermined maximum flow rate and thereby functions as a speed control for the windmill, while the bypass valve opens to shunt hydraulic fluid from the relief valve in response to the presence of some predetermined maximum hydraulic fluid temperature.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENT

Figure 1:
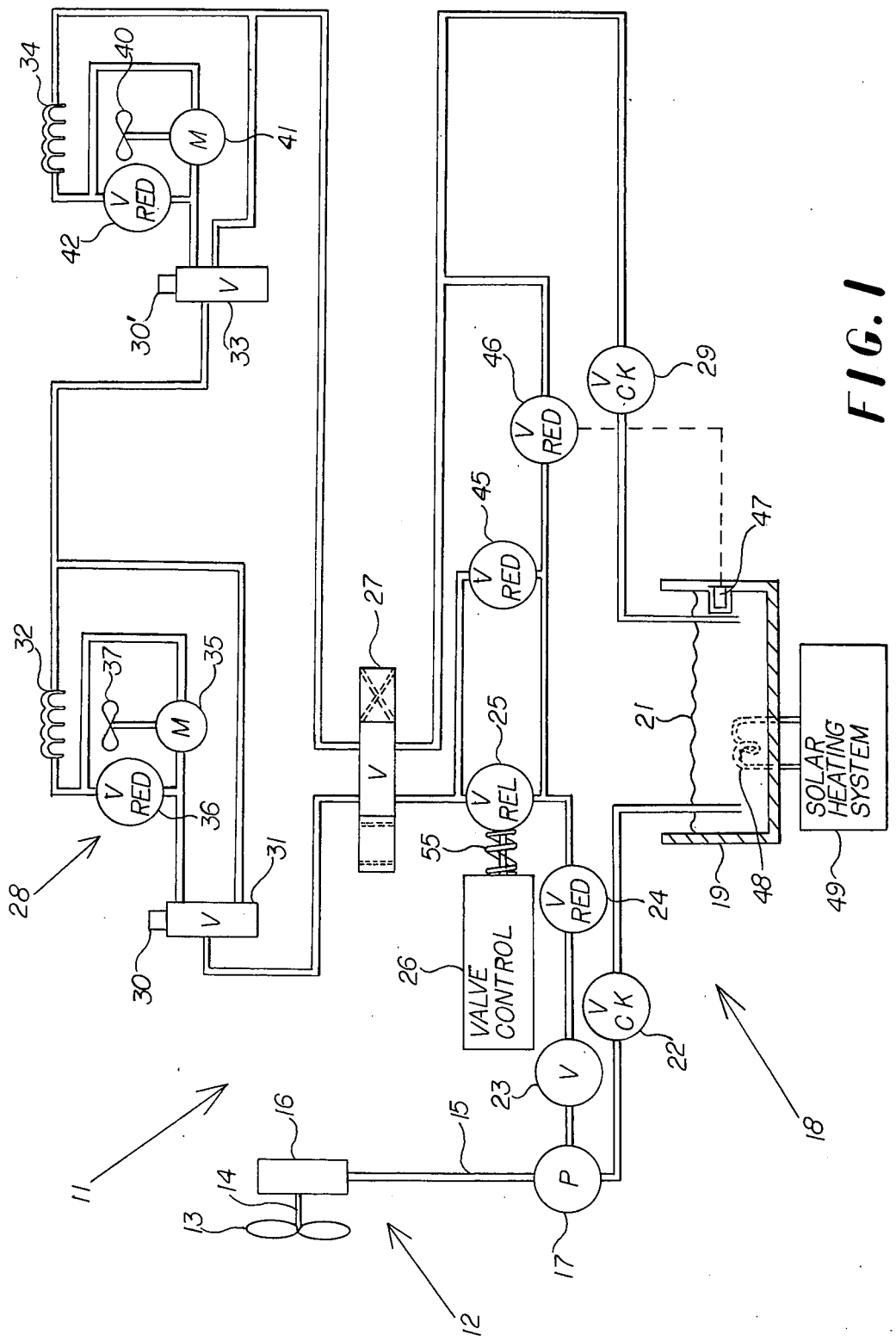
FIG. 1 is a schematic view illustrating the invention.

Referring now to FIG. 1, there is shown a wind powered heating system 11 in accordance with the present invention. A windmill 12 has blades 13 oriented for rotation by a prevailing wind. Coupled between an input shaft 14 from the blades 13 and an output shaft 15 is a motion conversion system 16. Preferably, the conversion system 16 is a type that drives the output shaft 15 in the same direction for either direction of rotation by the input shaft 14. A motion converter of this type is disclosed, for example, in U.S. Pat. No. 3,952,723.

Driven by the output shaft 15 is an hydraulic pump 17 in a circulation system 18 that includes an insulated hydraulic fluid reservoir 19 filled with an hydraulic fluid 21. When activated the pump 17 forces fluid 21 from the reservoir 19 through a check valve 22, a shut-off valve 23 and a flow control valve 24 to the inlet of an adjustable relief valve 25. The closure bias force on the relief valve 25 is automatically adjusted by a wind velocity responsive valve control mechanism 26 described in greater detail hereinafter. Connected to the output of the relief valve 25 is a four-way valve 27 that circulates hydraulic fluid through a heat exchange system 28 and a check valve 29 back into the reservoir 19. Included in the heat exchange system 28 is a first ambient temperature responsive valve 31 that controls the flow of hydraulic fluid to a first heat exchanger coil 32 and another ambient temperature responsive valve 33 that controls the flow of hydraulic fluid to a second heat exchange coil 34. Controlling the valves 31 and 33, respectively, are thermostats 30 and 30'. The heat exchange coils 32 and 34 would be mounted in areas requiring a supply of heated air. Connected between the valve 31 and the heat exchange coil 32 is a parallel combination of an hydraulic motor 35 and an adjustable flow control valve 36. The motor 35 drives a fan 37 that directs air over the heat exchange coil 32. A similar arrangement of a fan driving motor 41 and parallel flow control valves 42 are connected between the valve 33 and the heat exchange coil 34. A trickle flow bypass valve 45 is connected directly across the relief valve 25 while a temperature responsive flow control valve 46 is connected between the inlet of the relief valve 25 and the return line to the reservoir 19. Controlling the flow valve 46 is a thermostat 47 mounted in the reservoir 19 and responsive to the temperature of the hydraulic fluid 21. Also mounted in the reservoir 19 in heat exchanging relationships with the fluid 21 is a heat exchanger 48 of a solar heating system 49.

Figure 2:
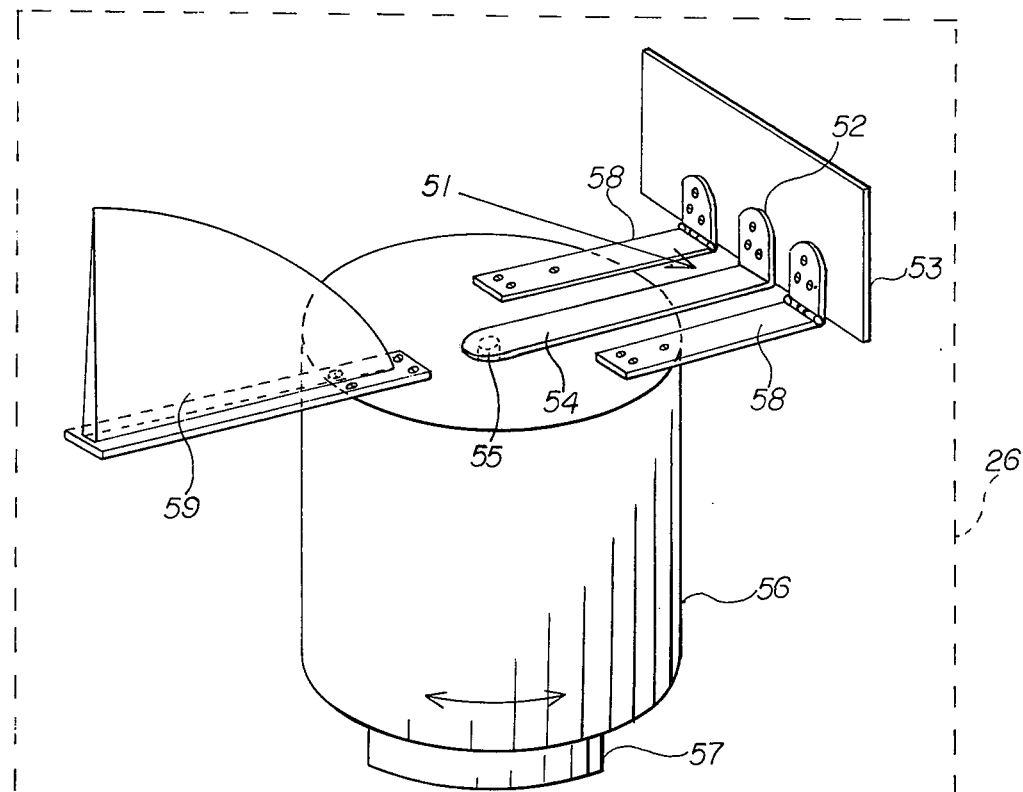
FIG. 2 is a schematic view illustrating a wind responsive valve controller for use in the system of FIG. 1.

As shown in FIG. 2 the valve control mechanism 26 includes an L-shaped lever 51 having one arm 52 secured to a vane 53 oriented so as to encounter the wind driving the windmill 12. The other arm 54 of the lever 51 engages an actuator 55 that acts on a spring member 55 that provides the closure bias for the relief valve 25. Supporting the vane 53 from a housing 56 rotatably mounted on a fixed base 57 are a pair of hinges 58. Also attached to the housing is a guide fin 59 that maintains the vane 53 in a position facing the prevailing wind direction.

During use of the system 11, the wind driven pump 17 forces hydraulic fluid through the valves 23, 24 and 25 to the heat exchange system 28. Most of the pressure drop in the system occurs in the relief valve 25 wherein the major portion of the work performed by the windmill 12 is converted into heat energy that is acquired by the circulating fluid. The valve control mechanism 26 functions to optimize the use of the energy available in the wind driving the windmill 12. As the available energy rises with the increasing wind velocity, the vane 53 causes the lever 51 to increase the force applied to the actuator 55. This in turn increases the closure bias provided in the relief valve 25. Accordingly, the work performed in the relief valve 25 and resultant heat generation therein increases in dependence upon the wind velocity sensed by the vane sensor 53. This system automatically allows for maximum utility of the energy available in the wind driving the windmill 12.

The heated fluid is circulated into the heating zones occupied by the heat exchange coils 32 and 34. In those zones the heat content of the fluid is given up to air forced over the coils 32 and 24, respectively, by the fans 37 and 40. The thermostat 30 senses the ambient temperature in the zone occupied by the coil 32 and at a predetermined setting thereof actuates the valve 31 causing the heated fluid to bypass the coil. Similarly, the thermostat 30' controls the valve 33 to bypass the coil 34 in response to a predetermined temperature in that zone. The speed of each of the fan driving motors 35 and 41, respectively, can be adjusted by the adjustable flow control valves 36 and 42 to control the speeds of the fans 37 and 40.

Figure 3:
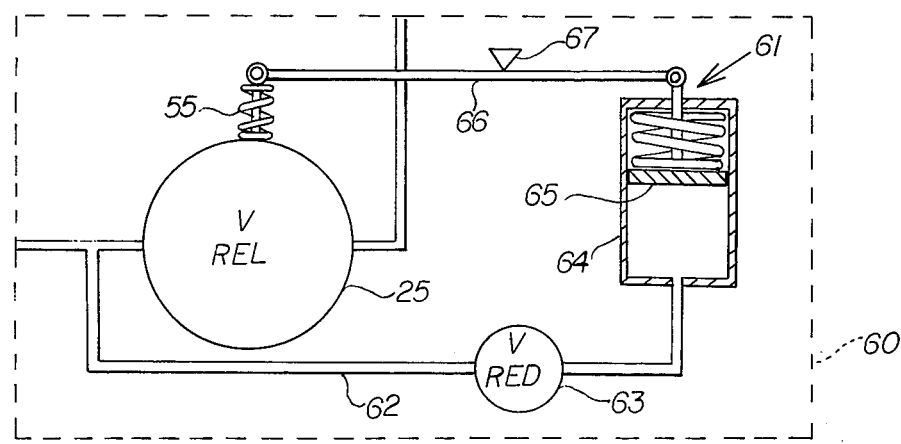
FIG. 3 is a schematic view of a pressure responsive valve controller for use with the system of FIG. 1.

Referring now to FIG. 3, there is shown another sensor embodiment 60 for use in the system 11 illustrated in FIG. 1. The sensor 60 includes an hydraulical pressure feedback mechanism 61 that can be substituted for the valve control 26 shown in FIG. 2. Secondarily responsive to wind velocity the gauge 61 also controls the relief valve 25. As wind velocity increases the pump 17 produces an increased fluid pressure at the inlet of the valve 25. This increased pressure is transmitted via a bypass line 62 and a flow control valve 63 to a cylinder 64 that retains a spring biased piston 65. Attached to the piston 65 is a rod that is coupled to an end of a lever 66 accommodated by a fulcrum 67. The opposite end of the lever 66 is secured to the actuator 55 that controls the closure lines on the relief valve 25. In response to increased fluid pressure in the cylinder 64, the piston 65 moves outwardly causing the lever 66 to pivot about the fulcrum 67. This induces an inward movement of the actuator 55 to increase the closure bias on the relief valve 25. Thus, as with the embodiment shown in FIG. 2, the work performed in the relief valve 25 and resultant heat generation therein increases in dependence upon the wind velocity as sensed by the gauge mechanism 61.

Obviously, many modifications and variations of the present invention are possible in light of the above teachings. It is to be understood, therefore, that the invention can be practiced otherwise than as specifically described.

What is claimed is:

1. Wind powered heating apparatus comprising:
   a circulation system for hydraulic fluid;
   a pump for pumping the fluid through said circulation system;
   windmill means for driving said pump means;
   an adjustable pressure responsive relief valve for restricting the flow of hydraulic fluid in said circulation system, said relief valve establishing an adjustable reduction of the hydraulic pressure in said circulation system;
   sensing means responsive to the wind velocity encountered by said windmill means;
   valve control means responsive to said sensing means for automatically adjusting said relief valve so as to establish the level of said fluid pressure reduction in dependence upon said wind velocity; and
   heat exchange means for removing heat from the hydraulic fluid.

2. Apparatus according to claim 1 wherein said sensing means comprises a wind velocity gauge means positioned so as to be actuated by the wind encountered by said windmill means.

3. Apparatus according to claim 2 wherein said relief valve comprises spring bias means exerting a closure force thereon, and said valve control means comprises adjustment means for varying the closure force applied by said spring bias means.

4. Apparatus according to claim 3 wherein said wind velocity gauge means comprises vane means exposed to the wind and mechanical linkage means coupled between said vane means and said spring bias means.

5. Apparatus according to claim 4 wherein said circulation system comprises a storage reservoir for suppling hydraulic fluid to said pump and receiving hydraulic fluid from said heat exchange means, and including a solar heating system having a solar heat exchanger for supplying heat to the hydraulic fluid in said reservoir.

6. Apparatus according to claim 5 including an adjustable flow control valve connected in series with said pump and said relief valve, and a bypass valve connected in parallel with said relief valve and responsive to the temperature of the hydraulic fluid in said circulation system.

7. Apparatus according to claim 1 wherein said sensing means comprises hydraulic gauge means responsive to the fluid pressure at the inlet of said relief valve.

8. Apparatus according to claim 7 wherein said relief valve comprises spring bias means exerting a closure force thereon, and said valve control means comprises adjustment means for varying the closure force applied by said spring bias means.

9. Apparatus according to claim 8 wherein said valve control means comprises an hydraulically actuated mechanical linkage for varying the closure force applied by said spring bias means.

10. Apparatus according to claim 9 wherein said circulation system comprises a storage reservoir for supplying hydraulic fluid to said pump and receiving hydraulic fluid from said heat exchange means, and including a solar heating system having a solar heat exchanger for supplying heat to the hydraulic fluid in said reservoir.

11. Apparatus according to claim 10 including an adjustable flow control valve connected in series with said pump and said relief valve, and a bypass valve connected in parallel with said relief valve and responsive to the temperature of the hydraulic fluid in said circulation system.

* * * * *